United States Patent
Takao et al.

(10) Patent No.: US 6,175,839 B1
(45) Date of Patent: Jan. 16, 2001

(54) FILTER INTERFACE FOR MANAGING PRINTER SYSTEM INFORMATION

(75) Inventors: Nobuyuki Takao, Torrance; Gilbert K. K. Leong, La Canada-Flintridge; Jennifer D. Thomas, Hermosa Beach; Charles H. Evans, IV, Manhattan Beach; Joseph Z. Fung, Artesia; Vikram R Mahuvakar, Alhambra, all of CA (US)

(73) Assignee: Fuji Xerox, Tokyo (JP)

( * ) Notice: Under 35 U.S.C. 154(b), the term of this patent shall be extended for 0 days.

(21) Appl. No.: 08/976,180

(22) Filed: Nov. 21, 1997

(51) Int. Cl.⁷ .................................................. G06F 15/00
(52) U.S. Cl. ........................ 707/500; 707/522; 709/203
(58) Field of Search .................................. 707/500, 526, 707/522; 709/203, 238, 245, 246; 345/112; 395/200.75, 200.76, 200.68, 200.33; 358/261.1

(56) References Cited

U.S. PATENT DOCUMENTS

| | | | |
|---|---|---|---|
| 5,475,805 | 12/1995 | Murata | 707/513 |
| 5,517,316 | * 5/1996 | Hube | 358/296 |
| 5,537,550 | * 7/1996 | Russell et al. | 709/224 |
| 5,537,626 | * 7/1996 | Kraslavsky et al. | 710/8 |
| 5,935,262 | * 8/1999 | Barrett et al. | 714/46 |

* cited by examiner

Primary Examiner—Stephen S. Hong
Assistant Examiner—Cong-Lac Huynh
(74) Attorney, Agent, or Firm—Oliff & Berridge, PLC

(57) ABSTRACT

A filter interface allows a filter to send extracted attribute information extracted from the master document data to a server. The server then stores the received attribute information into an attribute database.

18 Claims, 5 Drawing Sheets

FILTER INTERFACE FOR MANAGING PRINTER SYSTEM INFORMATION

BACKGROUND OF THE INVENTION

1. Field of Invention

This invention relates to a filter interface between a filter and a server in a document printing system. In particular, this invention is directed to a filter interface that allows a filter to send extracted attribute information to a server.

2. Description of Related Art

FIG. 1 shows an overview of the flow of document data and attribute information in a printing system. When the client 110 sends a print request to a server 120, the client 110 sends a document data package 200, as shown in FIG. 2. The document data package 200 includes master document data 220, which includes the text of the document, and document attribute data 210, which includes attribute information about the document. For example, the document attribute data 210 includes paper size (in this case, A3), the number of images printed onto one page (in this case, 2-up) as shown in FIG. 2. Other attribute information may include client source, page numbers, user name, job name, etc.

When the server 120 receives the print request, the server 120 stores the document attribute data 210 into the attribute database 130. The server 120 then invokes the filter 140. The server 120 then sends the master document data 220 and the requested attribute information (the document attribute data 210 may be included) to the filter 140.

After filtering, the filter 140 sends modified document data back to the server 120. The server 120 then sends the modified document data to the printer 160 as a print job. After completing the print job, the printer 160 sends a report back to the server 120. After the server 120 receives the report from the printer 160, the server 120 extracts document attribute information needed for the account log 150 from the attribute database 130 and writes that information to the account log 150.

FIG. 3 shows the interaction between the server 120 and the filter 140. The process of the server 120 is different from that of the filter 140. The filter is registered with the server 120 using a filter definition 310. The server 120 invokes the filter 140, based on the command element of the filter definition 310. When the server 120 invokes the filter 140, the server 120 checks the command element in the filter definition 310. If some attribute names (in this case, number-up and content orientation) are found in the command element, the server 120 sends the attribute information corresponding to each attribute name to the filter 140 as the argument of the command. Thus, the filter 140 gets the attribute information needed to perform the operation from the command line found in the filter definition 310. The input data and output data are sent and received using a pipeline between the server 120 and the filter 140. The filter 140 gets the master document data 220 from the standard input and sends the modified document data to the standard output.

According to the above description, the filter 140 can get attribute information (e.g., number-up, content orientation, etc.) indicated in the command element of the filter definition 310. However, the filter 140 has no way to send attribute information that has been extracted in the filtering operation back to the server 120.

In addition, all attribute information which needs to be written to the account log 150 is not always included in the attribute information 210 that the client 110 sends to the server 120 or the attribute database 130. Some needed attribute information (e.g., medium-size) may be embedded in the master document data 220. However, the filter 140 does not have any way to send the extracted attribute information to the server 120 or to the attribute database 130. Therefore, some attribute information may not be properly written into the account log 150. Thus, the account log 150 cannot keep the exact attribute information regarding the print job and the document.

SUMMARY OF THE INVENTION

This invention provides a filter interface that allows the filter to extract document attribute information from the master document data and send the extracted attributes to the server. The server can then store the received document attribute information into an attribute database.

In this arrangement, modification of extracted document attribute information for the attribute database is performed by the server and not by the filter. This provides an added measure of security by not permitting third parties to access the attribute database through the filter. After the document is printed, the server gets the requested attribute information for accounting purposes from the database and writes the attributes into the account log. The account log can keep the exact attribute information regarding the print job and the document.

These and other features and advantages of this invention are described or apparent from the following detailed description of the preferred embodiments.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

Figure 1:
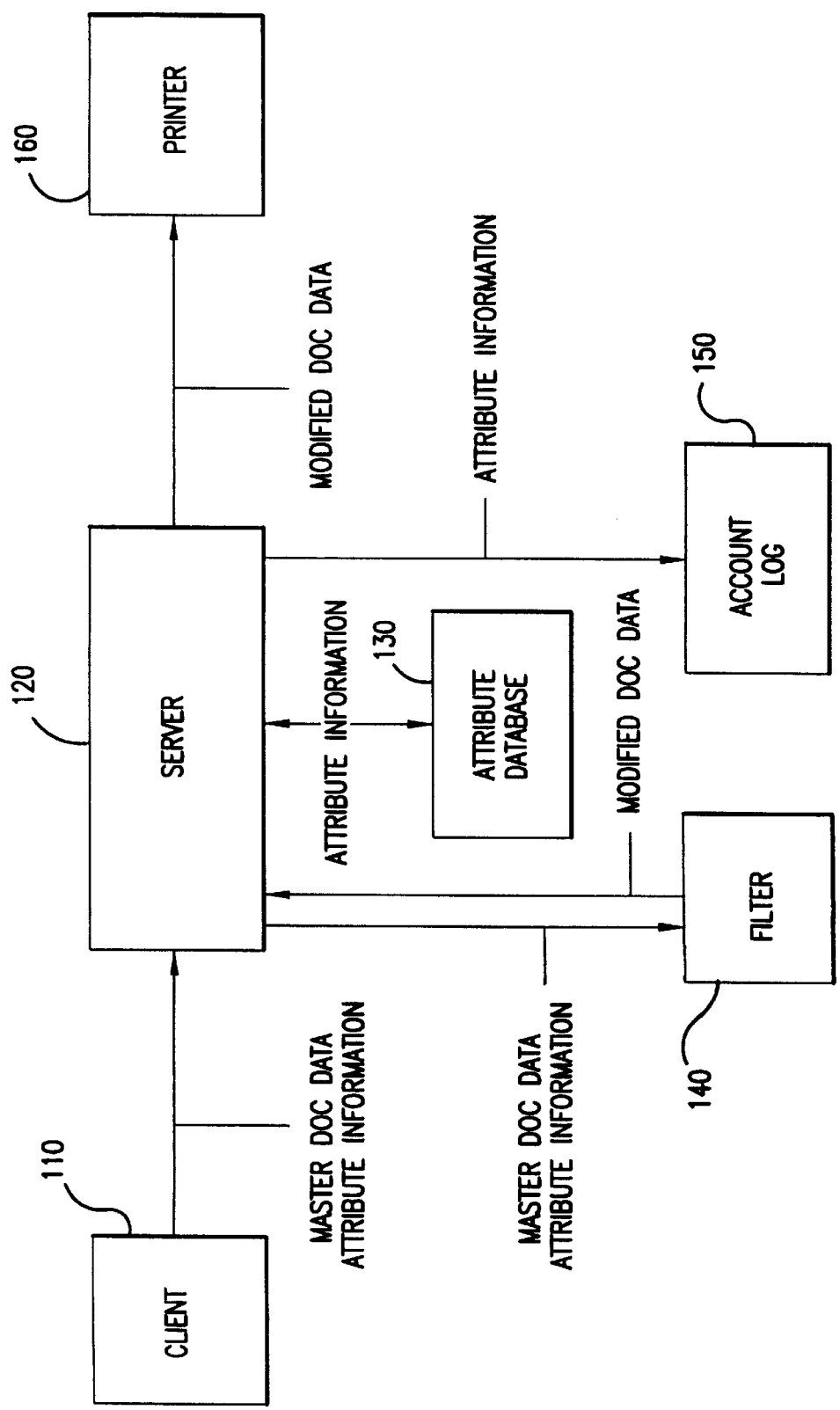
FIG. 1 is a diagram of the conventional flow of document and attribute data.
Figure 2:
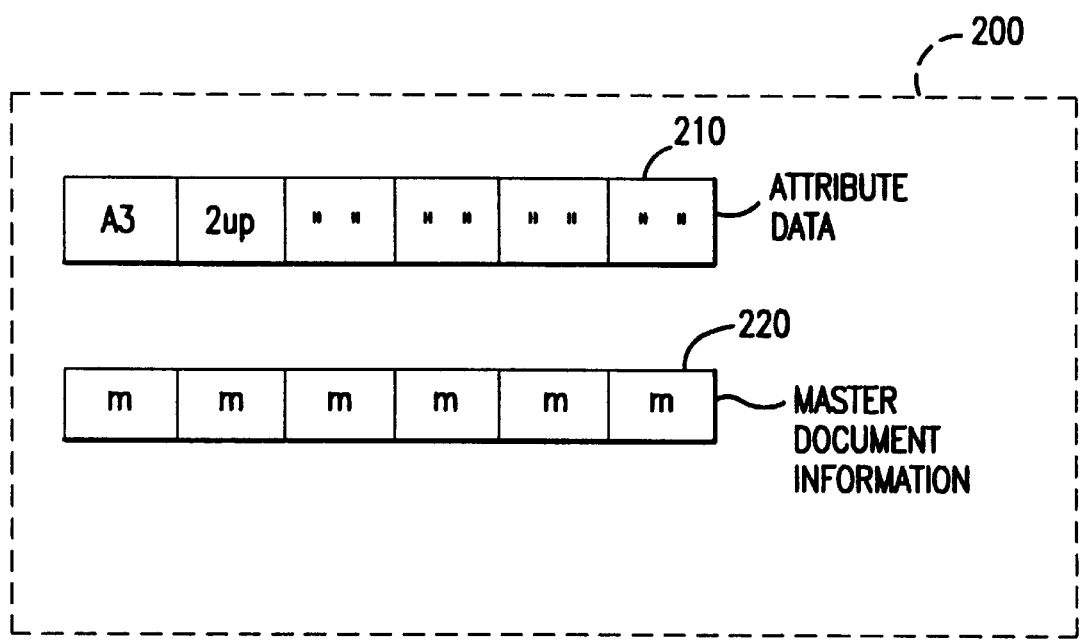
FIG. 2 shows a composite document data packet.
Figure 3:
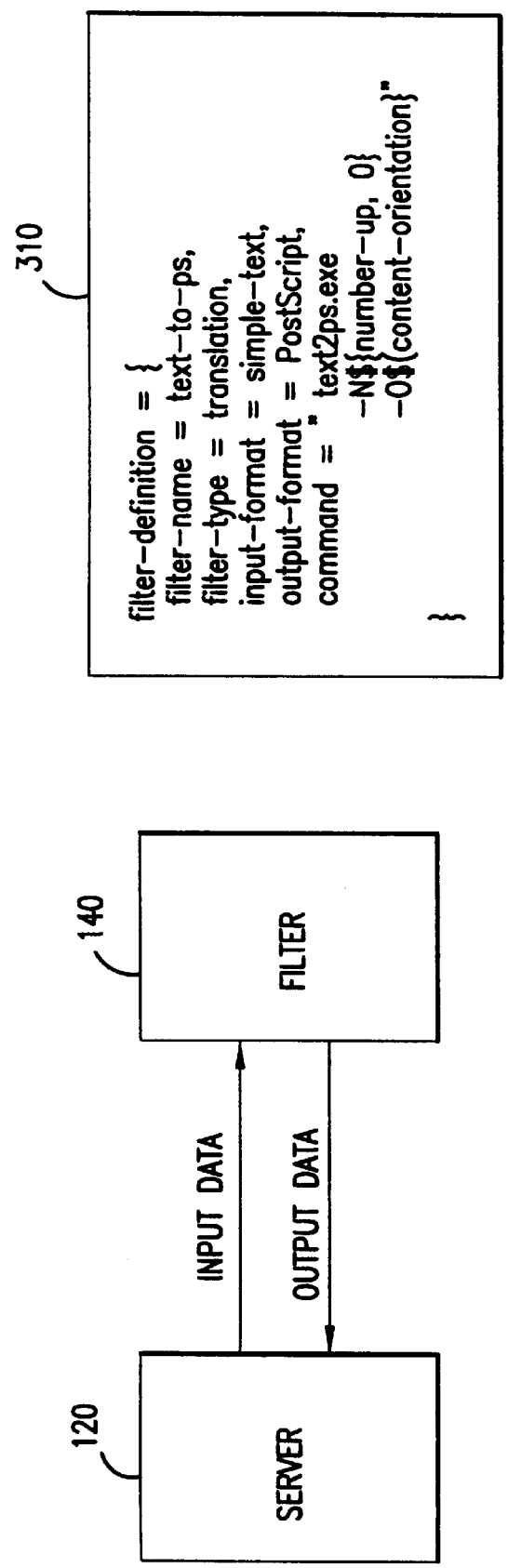
FIG. 3 shows the conventional filter model and an exemplary filter definition.
Figure 4:
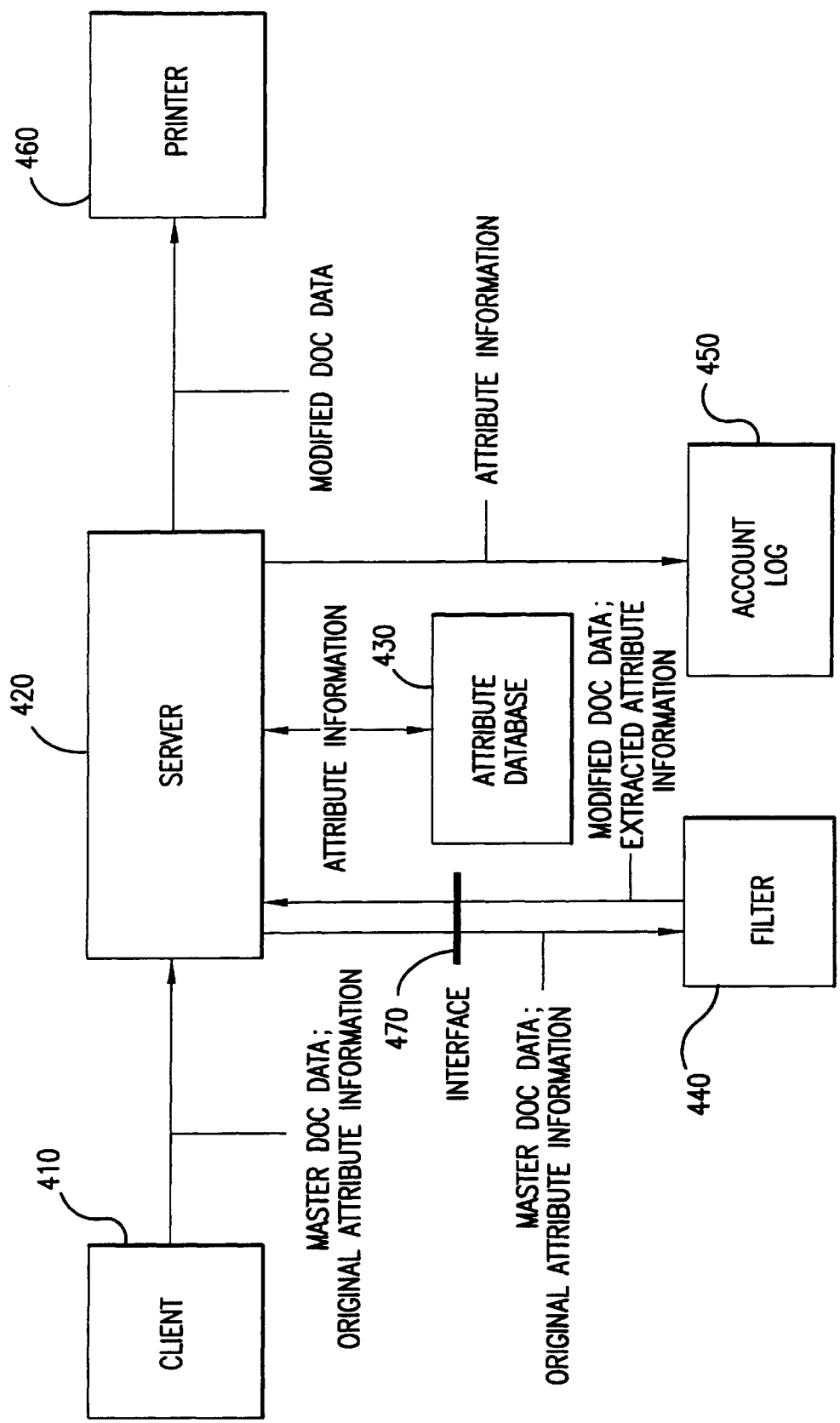
FIG. 4 is a diagram showing the flow of document and attribute data using the filter interface of the invention.

FIG. 4 shows an overview of the flow of document and attribute data in a printing system utilizing the filter interface of this invention. The client 410 sends a print request to the server 420 in the form of the document package 200, containing the master document data 220 and the document attribute data 210 related to the print request and the document, as shown in FIG. 2. When the server 420 receives the print request, the server 420 stores the attribute data 210 into an attribute database 430. The server 420 then invokes the filter 440. The filter 440 in turn, sends a request to the server 420 via a filter interface 470 for the master document data 220 and document attribute data 210. The server 420 then sends the requested information to the filter 440 through the filter interface 470.

By using the filter interface 470, the filter 440 can extract attribute information (e.g., medium-size) embedded in the master document data 220. The filter interface 470 allows the data to be sent and understood by the server 420. The server 420 then stores the received attribute data to the attribute database 430.

Using the filter interface 470, the server 420, rather than the filter 440, modifies the extracted attribute data for storage into the attribute database 430.

That is, the filter 440 is denied direct access to the attribute database 430. This is important in terms of computer system security.

After filtering, and after the filter 440 sends the modified document data to the server 420 through the filter interface 470, the server 420 sends the modified document to the printer 460 as a print job. The printer 460 reports the completion of the print job to the server 420. After the server 420 receives the report from the printer 460, the server 420 extracts the needed attribute information for accounting purposes from the attribute database 430 and writes the attribute data to the account log 450. Thus, the account log 450 can keep the exact attribute information regarding the print job and the document.

Figure 5:
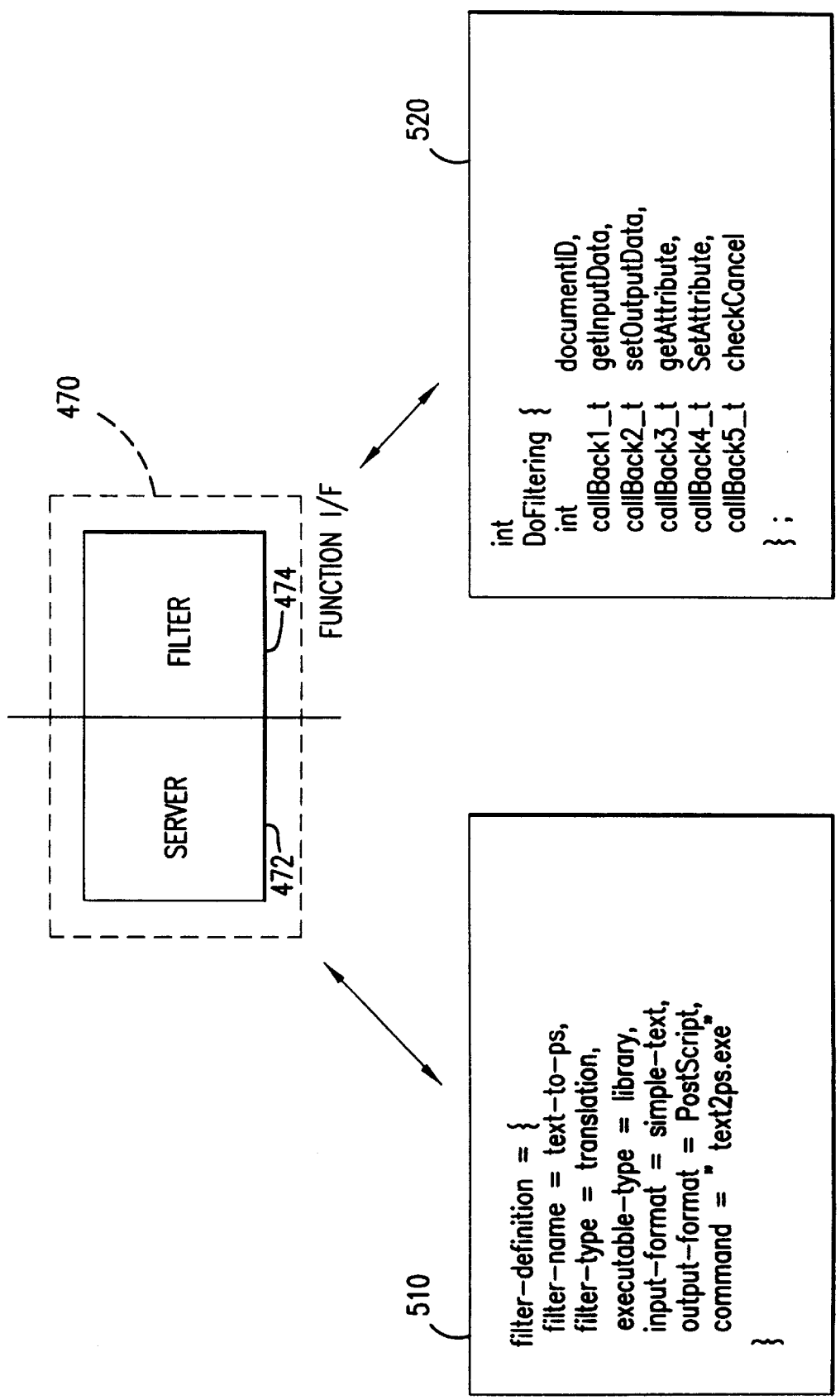
FIG. 5 is a diagram of the filter interface function and an exemplary filter definition and call-back functions.

FIG. 5 shows the interaction between the server 420, the filter 440, and a filter interface 500, including a filter definition 510 and a function for the execution 520 which includes some call-back functions as the argument. In this case, a process of the server 420 is the same as that of the filter 440.

As shown by the filter definition 510, the filter 440 is implemented as a "library," which is a dynamically loaded module. The filter definition 510 indicates the interface type (i.e., executable-type) during registration. The server 420 checks the type of filter and controls the filter according to which type (library or execution) appears. For example, if the executable-type is "library", the command element for the filter is a path name of the library. In this case, the server 420 calls the execution function 520, which must be provided by the library, in order to invoke the filter. Alternatively, if the executable-type is "execution", the command element for the filter is a path name of the execution file. In this case, the server 420 invokes the filter 440 according to the manner used in the prior art.

In the "library" type, the filter 440 receives call-back functions in order to call and obtain any required attributes 210 and the master document data 220 from the server 420. In addition, the filter 440 can use the call-back functions to return printer-ready data and the extracted attributes to the server 420. The call-back functions may also include some functions to check cancel requirements of the operation, etc.

As shown in FIGS. 4 and 5, the server, including the filter interface, is preferably implemented on a programmed general purpose computer. However, the server, including the filter interface, can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FGPA or PAL, or the like. In general, any device on which a finite state machine capable of performing the functions of the server, including the functions of the filter interface, as shown in FIGS. 4 and 5, can be used to implement the server.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A system for extracting attribute data from master document data and providing the extracted attribute data to a server, comprising:

a filter that generates printer-ready data and extracts attribute data from at least the master document data; and an interface that provides at least the master document data from the server to the filter, the interface providing the printer-ready data and the extracted attribute data from the filter to the server.

2. The system of claim 1, further comprising a printer for printing the printer-ready data.

3. The system of claim 2, wherein the printer sends a signal to the server that a print job has been completed.

4. The system of claim 3, further comprising an account log for receiving and storing some of the extracted attribute information upon the server receiving the signal from the means for printing.

5. The system of claim 1, further comprising an attribute database for receiving and storing extracted attribute data from the server.

6. The system of claim 1, wherein the server modifies the extracted attribute information.

7. A system for extracting attribute data from master document data and providing the extracted attribute data to a server, comprising:

filtering means for generating printer-ready data and for extracting attribute data from at least the master document data; and interface means for providing at least the master document data from the server to the filtering means and for providing the printer-ready data and the extracted attribute data from the filtering means to the server.

8. The system of claim 7, further comprising printing means for printing the printer-ready data.

9. The system of claim 8, wherein the printing means sends a signal to the server, the signal indicating that a print job has been completed.

10. The system of claim 9, further comprising storage means for storing at least a portion of the extracted attribute information upon the server receiving the signal from the printing means.

11. The system of claim 7, further comprising storage means for storing the extracted attribute data.

12. The system of claim 7, wherein the server modifies the extracted attribute information.

13. A method for extracting attribute data from master document data and providing the extracted attribute data to a server, comprising:

providing at least the master document data from the server to a filter interface;

providing at least the master document data from the filter interface to a filter;

using the filter to generate printer-ready data from at least the master document data;

using the filter to extract the attribute data from at least the master document data;

providing the printer-ready data and the extracted attribute data from the filter to the filter interface; and providing the printer-ready data and the extracted attribute data from the filter interface to the server.

14. The method of claim 13, further comprising printing the printer-ready data.

15. The method of claim 14, wherein printing the printer-ready data includes sending a signal to the server that the printer-ready data has been printed.

16. The method of claim 15, further comprising storing at least a portion of the extracted attribute information upon the server receiving the signal.

17. The method of claim 13, further comprising storing the extracted attribute data.

18. The method of claim 13, further comprising modifying the extracted attribute information.

* * * * *